June 7, 1949.   G. WEST   2,472,240
BOBBIN CLUTCH
Filed Sept. 11, 1946
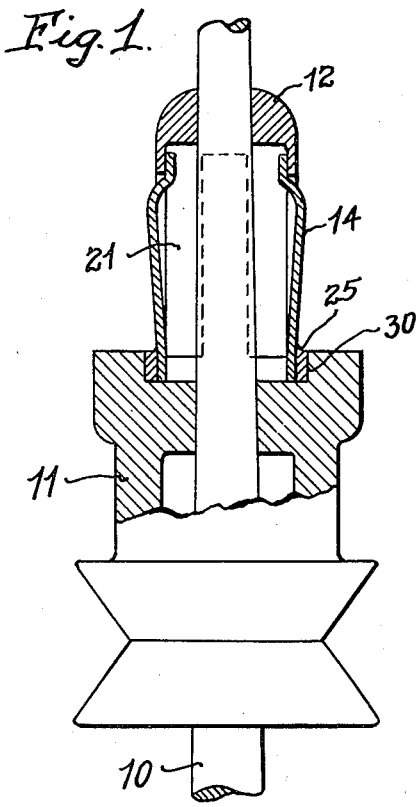
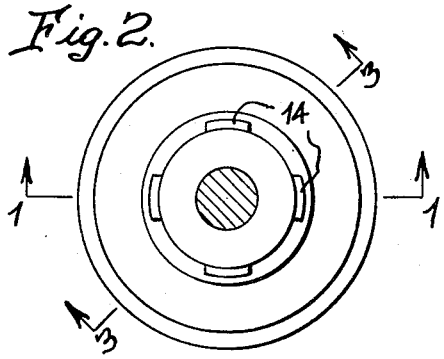
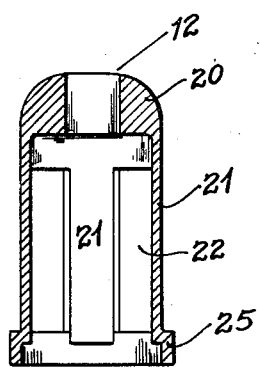
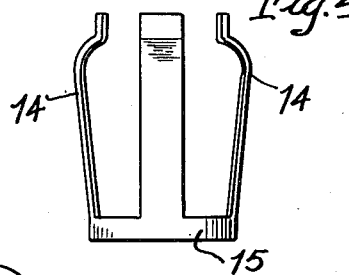
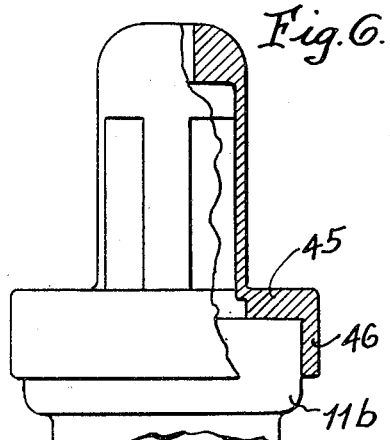
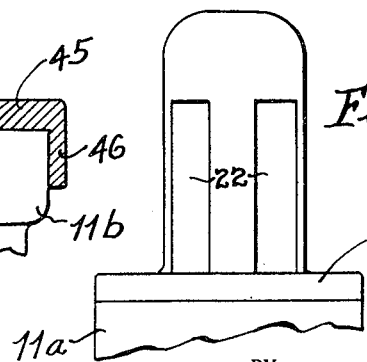
INVENTOR.
George West.
BY Chas. T. Hawley
ATTY.

Patented June 7, 1949

2,472,240

UNITED STATES PATENT OFFICE 2,472,240

BOBBIN CLUTCH

George West, Whitinsville, Mass., assignor to Whitin Machine Works, Whitinsville, Mass., a corporation of Massachusetts Application September 11, 1946, Serial No. 696,323

2 Claims. (Cl. 242—46.4)

1

This invention relates to spindles used on spinning or twisting machines, and more particularly to clutches for driving bobbins mounted on such spindles.

It has been heretofore customary to provide a bobbin clutch for such purposes in which a plurality of spring fingers press outwardly to engage and drive the bobbin, and in which the driving pressure of the fingers is increased by centrifugal force. The spring fingers have been mounted in a slotted bushing or shell supported on the spindle blade, but the spring-separating portions of the bushing which extend downward from the head of the bushing have been relatively weak and have been frequently broken or displaced. Furthermore, the driving whirl on the spindle has been sometimes displaced downwardly when a fresh bobbin was too forcibly applied, thus separating the whirl from the slotted bushing and allowing the clutch parts to separate and to admit dust or lint.

It is the general object of my present invention to provide an improved bushing construction by which the objections above noted are effectively avoided.

My invention further relates to arrangements and combinations of parts which will be hereinafter described and more particularly pointed out in the appended claims.

Preferred forms of the invention are shown in the drawings, in which

Fig. 1 is a partial side elevation of a spindle with my improved bobbin clutch shown in section along the line 1—1 in Fig. 2;

Fig. 2 is a plan view of the parts shown in Fig. 1;

Fig. 3 is a sectional front elevation of one form of my improved bushing, taken along the line 3—3 in Fig. 2;

Fig. 4 is a side elevation of a spring finger assembly;

Fig. 5 is a front view of a modified bushing; and

Fig. 6 is a front view, partly in section, showing a further modification.

Referring to Fig. 1, I have shown a spindle blade 10 having a driving whirl 11 forced thereon, and I have shown my improved bobbin clutch as comprising a bushing 12 and a plurality of spring fingers 14. The spring fingers 14 are preferably formed in a one-piece spring assembly, as

2 shown in Fig. 4, with the lower ends of the spring fingers 14 joined by connecting portions 15.

The bushing 12 (Fig. 3) comprises a cap or head portion 20, a plurality of depending projections 21 separated by slots 22, and a continuous annular bottom flange 25 to which the lower ends of all of the projections 21 are secured. Preferably, the entire bushing 12 is formed as a single piece of material.

The flange 25 is seated in a recess 30 in the upper end of the whirl 11 and is preferably a drive fit therein, while the head 12 is an easier push fit on the blade 10.

With this construction, it will be seen that the projections 21 are firmly secured in spaced relation at both their upper and lower ends, so that breakage or displacement thereof is effectively avoided. Furthermore, as the lower flange 25 is a drive fit in the top of the whirl 11, while the head 12 is less tightly fitted to the blade 10, the bobbin clutch will remain assembled with the whirl 11, even if the whirl should be displaced downward on the spindle blade.

In the construction shown in Fig. 5, the bottom flange 40 is extended outwardly, so that it covers the upper end of the whirl 11a. With this construction, the bobbin is seated on the flange 40, so that any downward displacement of the whirl caused by a blow from the bobbin will similarly displace the bobbin clutch, and the parts will be retained in their original relation.

In the construction shown in Fig. 6, the flange 45 is still further extended and is provided with a depending sleeve portion 46 adapted to be forced on the upper end of the driving whirl 11b. This construction still more firmly retains the bobbin clutch and whirl in the desired driving relation.

In all forms of my invention it will be clear that the spring-locating projections 21 of the bushing 12 are firmly secured in position at both ends thereof, and that axial separation of the whirl and bobbin clutch is effectively prevented.

Having thus described my invention and the advantages thereof, I do not wish to be limited to the details herein disclosed, otherwise than as set forth in the claims, but what I claim is:

1. In a spindle having a blade and a driving whirl mounted thereon, a bobbin clutch comprising a one-piece bushing having a head mounted on said blade, a flange at the bottom of said bushing and a slotted body portion connecting said head and flange, said flange having an inner annular recess therein, an assembly of resilient bobbin-clutching fingers having an integral annular connection between their lower ends, said fingers being positioned in the slots of said body portion and said integral annular connection being positioned and seated in said inner annular recess of said bottom flange of said bushing.

2. An integral one-piece bushing for a rotatable bobbin clutch comprising an annular head portion, a continuous annular bottom flange having an annular internal recess therein, and a slotted body portion connecting said head and flange, and the outside diameter of said slotted body portion being substantially the same as the greatest diameter of said recess, and said slots having unobstructed communication with said recess.

GEORGE WEST.

REFERENCES CITED

The following references are of record in the file of this patent:

UNITED STATES PATENTS

| Number | Name | Date |
|---|---|---|
| 1,072,345 | Matteson | Sept. 2, 1913 |
| 1,457,226 | Magrath | May 29, 1923 |
| 1,478,789 | Magrath | Dec. 25, 1923 |
| 1,741,197 | Magrath | Dec. 31, 1929 |

FOREIGN PATENTS

| Number | Country | Date |
|---|---|---|
| 338,300 | France | Mar. 16, 1904 |